No. 630,452.　　　　　　　　　　　　　　　　　Patented Aug. 8, 1899.
H. L. DOOLEY.
CORN PLANTER.
(Application filed May 22, 1899.)
(No Model.)　　　　　　　　　　　　　　　　　2 Sheets—Sheet 1.
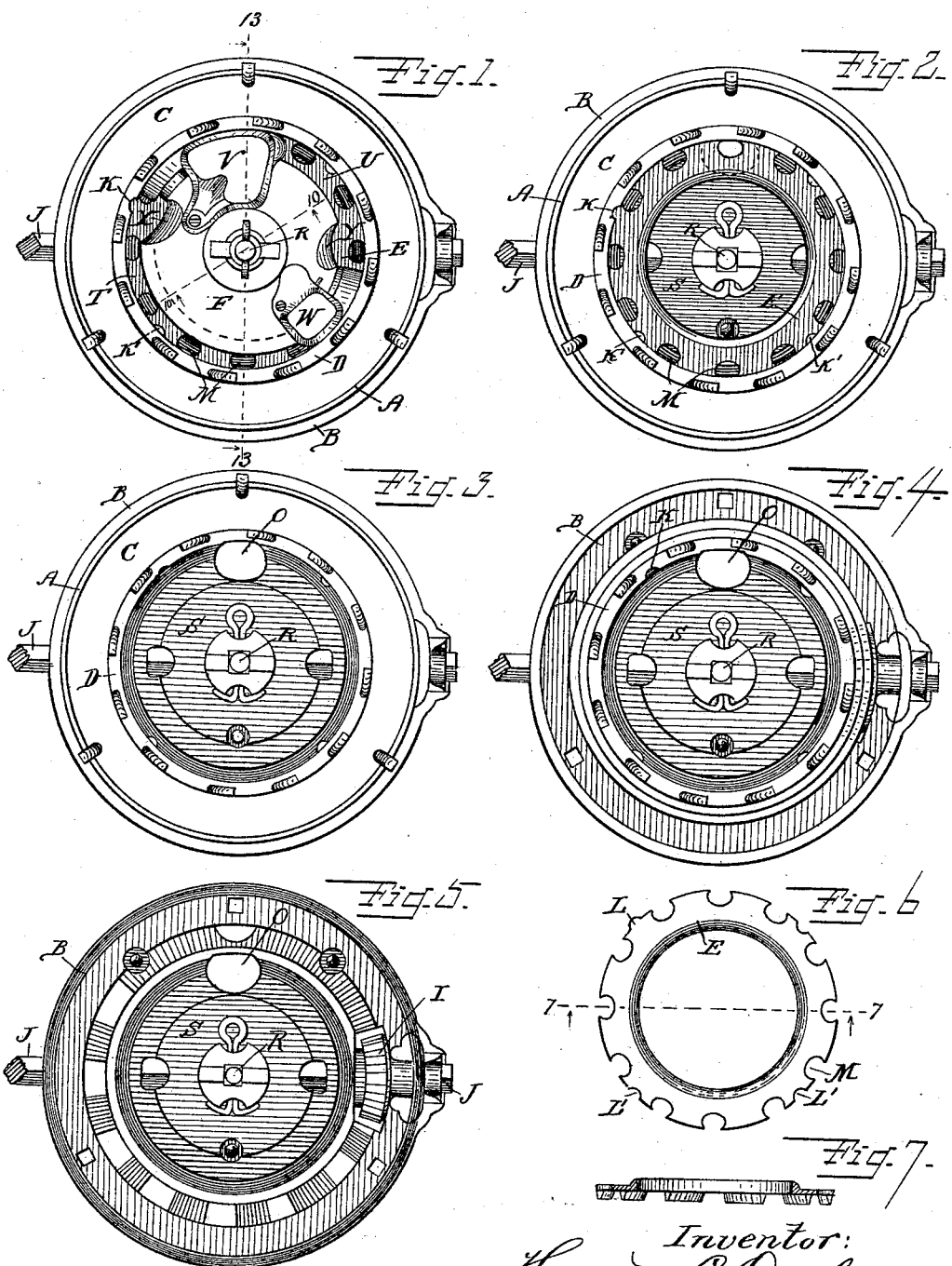
Witnesses:　　　　　　　　　Inventor:
　　　　　　　　　　　　　　　Harry L. Dooley No. 630,452. Patented Aug. 8, 1899.
H. L. DOOLEY.
CORN PLANTER.
(Application filed May 22, 1899.)
(No Model.) 2 Sheets—Sheet 2.
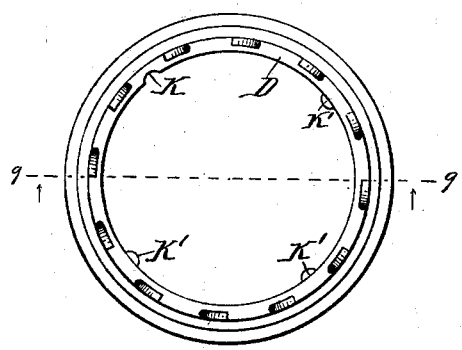
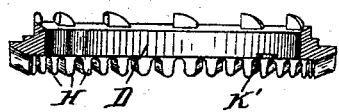
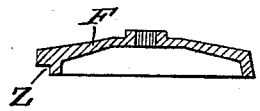
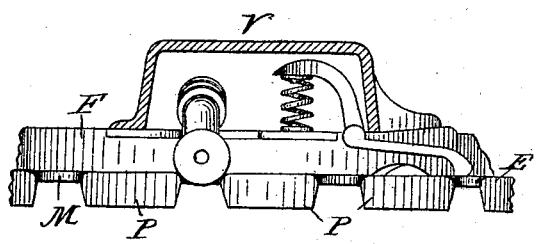
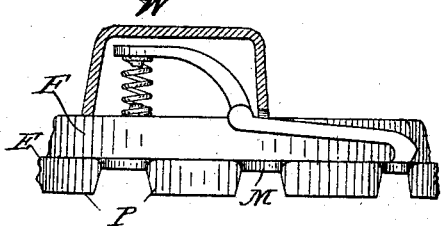
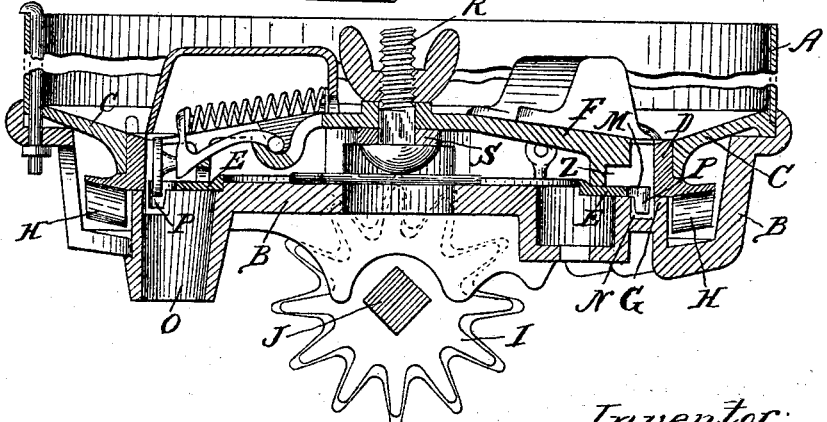
Witnesses:
P. R. Richards
F. H. Drury
Inventor:
Harry L. Dooley
By Raymond & Ourhundro
Attys.

UNITED STATES PATENT OFFICE.

HARRY L. DOOLEY, OF MOLINE, ILLINOIS.

CORN-PLANTER.

SPECIFICATION forming part of Letters Patent No. 630,452, dated August 8, 1899.

Application filed May 22, 1899. Serial No. 717,692. (No model.)

*To all whom it may concern:*

Be it known that I, HARRY L. DOOLEY, a citizen of the United States, residing at Moline, in the county of Rock Island and State of Illinois, have invented certain new and useful Improvements in Corn-Planters, of which the following is a specification.

This invention relates to improvements in corn-planters, but is more especially designed for use in connection with that class of corn-planters known as "rotary drop check-rowers," which class is exemplified by Letters Patent No. 593,295, granted Clarence H. Dooley November 7, 1897. In the machine of the said Letters Patent was effectually cured the previously-existing defects in machines of this class due to the irregularity of the feed by providing a seed measuring and delivering mechanism in the seedbox, which effectually separated single grains of seed from the supply in said seedbox, arranged them on edge, and delivered them edgewise to the seed-cups, which received them singly in substantially every one of the seed-cups at each revolution of the seed-cup wheel and delivered said single grains regularly, uniformly, and with nearly absolute certainty from each seed-cup to the throat of the seed-tube as said cups passed successively in their orbital travel. In said patented machine and in all other prior machines in this art known to me the feedway for the passage of the seed from the seedbox into the seed-cups has been of substantially circular form and practically uniform width throughout its length, the said patented machine, however, having been described as having the walls of the feedway slightly eccentric to one another, so that the passage or feedway will be gradually contracted throughout its length. In all such prior machines practice has developed a serious practical difficulty which my present invention is designed to overcome. With one continuous narrow feedway into which all of the kernels must fall edgewise the result is that in the planting operation the flat kernels fall readily into the feedway edgewise promptly and practically during most of the planting operation, continuously filling the feed-grooves from which the seed cells or cups take their supply, while the round kernels, and especially those that are too thick to fall into the feedway, are kept out of said grooves and can only occasionally enter the seed-cups at the usual enlargement of the feedway at the entering end thereof adjacent to the cut-off. At least this is true until practically all of the flat kernels have been planted, which leaves the round kernels to be last planted.

The primary object of my present invention is to afford the round kernels and the large kernels an equal opportunity with the flat kernels to enter the seed-cups during the planting without in any wise lessening the certainty and regularity with which the seed-cups will be filled during their orbital travel.

A further object of my invention is to insure the feeding to the seed-cups and the safe delivery to the throat of the seed-tube of kernels too large to enter the ordinary narrow feedway without, however, in any manner interfering with or reducing the certainty of the feed through the narrow feedway of the flat kernels whenever opportunity is offered.

These and such other objects as may hereinafter appear are attained by the devices illustrated in the accompanying drawings, in which—

Figure 1 represents a plan view of a seedbox for a corn-planter embodying my invention. Fig. 2 represents a similar view with the cut-off plate removed. Fig. 3 represents a view similar to Fig. 1 with the seed-cup plate removed. Fig. 4 represents a view similar to Fig. 3 with the seedbox bottom plate removed. Fig. 5 represents an inverted plan view of the seedbox. Fig. 6 represents a detailed plan view of the seed-cup plate. Fig. 7 represents a sectional view thereof on the line 7 7 of Fig. 6, looking in the direction indicated by the arrows. Fig. 8 represents a plan view of the seed-agitator. Fig. 9 represents a section thereof on the line 9 9 of Fig. 8. Fig. 10 represents a detailed section through the cut-off plate, taken on the line 10 10 of Fig. 1; Figs. 11 and 12, sectional elevations taken through the main and auxiliary cut-offs, respectively; and Fig. 13, a vertical section through the seedbox and feed mechanism on the line 13 13 of Fig. 1, looking in the direction indicated by the arrows.

To the end of carrying out the objects of my invention it consists, generally stated, in constructions, arrangements, and combinations of parts hereinafter described and made the subject-matter of claims which form part of this specification.

Similar letters of reference indicate the same parts in the several figures of the drawings.

Referring now by letter to the accompanying drawings, A indicates the seedbox, B a casting constituting the permanent bottom therefor, C a bottom plate, D the seed-agitators, E the seed-cup plate, and F the cut-off plate, all of which mechanisms are arranged and coöperate in the manner usual in machines of this class, and none of these parts as illustrated in the drawings, except the cut-off plate and such parts as directly coöperate therewith and as hereinafter pointed out and claimed, form the subject-matter of my present invention. Indeed, the particular construction and arrangement of the seed-cup plate and the agitator-ring as illustrated herein are the invention of C. H. Dooley, of Brokaw, Illinois, and hence I do not herein desire to specifically claim the same. In the arrangement of these mechanisms as shown in the drawings the agitator D, which is in the form of an annulus or ring, rests upon a vertical flange G, formed on the permanent bottom B of the seedbox, and is provided upon a radial flange extending from its lower edge with a series of teeth constituting a circular rack H, with which meshes a correspondingly-toothed gear-wheel I, rigidly mounted upon a cross-shaft J of the machine, to which power may be communicated from the ground-wheel or from the check-row attachments or in any other suitable manner.

For the purpose of causing the seed-cup plate and agitatator-ring to rotate in unison these members are provided with interlocking features, which are preferably in the form of complementary grooves or notches and projections, such as the groove or notch K and projections K' upon the inner periphery of the ring (see Figs. 1 and 8) and the corresponding projection L and grooves or notches L' (see Figs. 2 and 6) on the outer periphery of the plate. It is of course immaterial whether one or both sets of such interlocking features are employed and also whether the projections and grooves are upon one or the other of said members or whether other interlocking features are employed, so long as they serve to connect the said plate and the agitator-ring when the parts are assembled, so as to cause said ring and plate to rotate in unison. In the casting or permanent bottom B, underlying the seed-cups M in the seed-plate E, is formed a concentric groove N, constituting a well into which the seed project when they drop into the seed-cup, and to enforce the traversing of this groove by the seed from the point at which they enter the groove to the throat O of the seed-tube the seed-plate E is provided with depending sweeps P, which practically fill said groove, there being one sweep between each pair of seed-cups, so that once a seed enters a cup it is forced by the sweeps around the groove until it is discharged into the throat of the seed-tube. This feature is not of my invention, however, as it is fully shown and claimed in the aforesaid Letters Patent to C. H. Dooley, No. 593,295.

The cut-off plate F, as usual, is fixed and secured by a suitable central fastening-bolt R, which passes therethrough and through a bridge S, spanning an opening in the bottom casting B, upon which casting the bridge rests and of which it preferably forms a part.

Between the edges of the cut-off plate and the agitator-ring is formed a space which constitutes the feedway. This space or feedway, as clearly illustrated in Fig. 1, is of different widths at different portions of its length, the portion T thereof being of the usual width of such grooves or ways, especially that illustrated in the before-mentioned Letters Patent No. 593,295, while the portion U of said feedway is considerably wider. In fact, it is shown in the drawings as of nearly double the width of the narrower portion T of said way.

The sections or portions of the feedways are separated by cut-offs at the end of each section, the main cut-off V, which may be of any usual or desired construction, being located immediately above the throat O of the seed-tube, while an auxiliary cut-off W, also of ordinary construction, is preferably located at a point nearly opposite the main cut-off, although its exact location will of course be determined by the relative length of the sections of the feedway. Adjacent to each cut-off there is also provided the usual enlargement of the feedways. (Shown at X and Y in the drawings.)

Along its under edge, opposing the narrow section T of the feedway, the cut-off plate is rabbeted, as at Z, the rabbet extending from the auxiliary to the main cut-off. This rabbet permits the free passage past the narrow section of the feedway of the large and round or thick kernels of corn that enter the seed-cups at the wide section of the feedway without disturbing or ejecting the flat kernels that are lodged in the narrow section of the feedway waiting opportunity to drop into an empty seed-cup and without injury to the large kernels.

It will be noted that as the agitator-ring or the outer wall of the feedway corresponding thereto, which may or may not be movable, is circular, the different widths of the feedway are best obtained by forming the cut-off plate F of different diameters on different radii, or, in other words, by cutting away the said plate along a suitable length on its periphery, so as to reduce its diameter at such point. This is clearly shown in the drawings.

Now it will be readily understood that in operation with the proper supply of seed in the box when the machine is started up the seed will promptly and readily fill the seed-cups underlying the entire feedway both at its wide and narrow portions, and as the operation continues the flat kernels will arrange themselves edgewise in the narrow section of the feedway, quite filling the same, new kernels promptly taking the place of those which drop into the seed-cups. With my construction of feedway, however, the round and thick kernels have an equal opportunity to enter the seed-cups at the wide section of the feedway while the flat kernels are entering the same at the narrow section of said way during the planting operation, and while of course flat seed may also enter the seed-cups at the wide section of the feedway the opportunity afforded the round and thick kernels insures a substantially uniform proportionate feed of kernels of all sizes. Should any of the feed-cups fail to take a kernel when it passes the wide section, its charging will be assured when it passes the narrow section, because in this section of the feedway the flat kernels arrange themselves edgewise and are always ready to drop into any seed-cup that comes under said section empty.

I have found in practice that it will not answer to have the feedway contracted gradually from end to end, and, indeed, with the walls of the way inclined or contracted between the wide and narrow sections thereof there can be no certainty as to the continuous operation of the machine, for the seed will in either of such constructions inevitably wedge in said way and become crushed and broken, besides choking the feedway.

The best results will be attained by having the change from the wide to the narrow section of the way abrupt and locate the auxiliary cut-off between them. Furthermore, while the best results from my invention are attained by its use in a planter of the Dooley patented type, in which the feedway is provided with one movable and one fixed wall, obviously it is well adapted for use in connection with planters of other constructions. Neither do I desire to limit my invention to the construction and arrangement of parts shown and described, for such construction and arrangement are simply one form of embodiment of my invention, and many variations therefrom may be made without departing from the spirit of my invention.

Having thus fully described my invention, what I claim, and desire to secure by Letters Patent, is—

1. In a corn-planter, the combination with a seed-cup plate, of an overlying annular feedway composed of sections differing in width, substantially as and for the purpose described.

2. In a corn-planter, the combination with a seed-cup plate, of an overlying annular feedway composed of sections differing in width, one wall of which way is a fixed plate and the other wall a revoluble annulus-shaped plate, substantially as and for the purpose described.

3. In a corn-planter, the combination with a seed-cup plate, of an overlying annular feedway composed of sections differing in width and cut-offs interposed between said sections, substantially as and for the purpose described.

4. In a corn-planter, the combination with a seed-cup plate, of an overlying annular feedway composed of sections differing in width, one wall of said way being rabbeted along its under side edge opposing the narrower section of said way, substantially as and for the purpose described.

5. In a corn-planter, the combination with a seed-cup plate, of an overlying annular feedway composed of sections differing in width and a main and an auxiliary cut-off interposed between said sections, one wall of said way being rabbeted from the auxiliary to the main cut-off along its under side edge opposing the narrower section of said way, substantially as and for the purpose described.

6. In a corn-planter, the combination with the seed-cup plate and the seed-agitator constituting one wall of the feedway, of the cut-off plate overlying the seed-plate and constituting the other wall of the feedway, said cut-off plate being cut away along its periphery at one side thereof so as to give feedway-sections differing in width, substantially as and for the purpose described.

7. In a corn-planter, the combination with the seed-cup plate and the seed-agitator constituting one wall of the feedway, of the cut-off plate overlying the seed-plate and carrying a main and an auxiliary cut-off at opposite sides thereof, said cut-off plate constituting the other wall of the feedway and being cut away or reduced in diameter at one side thereof between the main and auxiliary cut-offs, substantially as and for the purpose described.

8. In a corn-planter, the combination with the seed-cup plate and the seed-agitator constituting one wall of the feedway, of the cut-off plate overlying the seed-plate and carrying a main and an auxiliary cut-off at opposite sides thereof, said cut-off plate constituting the other wall of the feedway and being cut away or reduced in diameter at one side thereof between the main and auxiliary cut-offs and said cut-off plate being rabbeted along its under side edge at the opposite side thereof between said cut-offs, substantially as and for the purpose described.

HARRY L. DOOLEY.

Witnesses:
ED. A. EVANS,
H. M. ROSSITER.